United States Patent Office 3,523,883
Patented Aug. 11, 1970

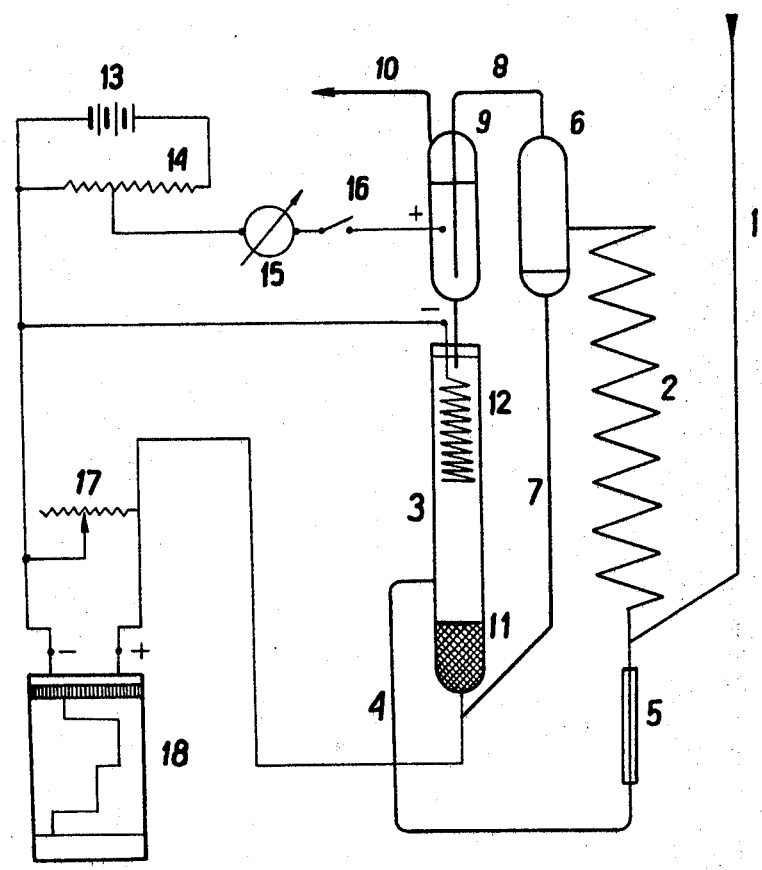

3,523,883
APPARATUS FOR REGENERATING ELECTRODES
Jerzy Waclawik, Ul. Kasprowicza 59, m. 8, Warsaw, Poland, and Stefan Waszak, Ul. Leohitow 14/16, Piaseczno-Golkow, Poland
Filed June 15, 1967, Ser. No. 646,390
Claims priority, application Poland, June 15, 1966, P 115,136
Int. Cl. G01n 27/54
U.S. Cl. 204—195        3 Claims

ABSTRACT OF THE DISCLOSURE

Method and equipment for the continuous regeneration of an electrode which is oxidized or reduced in the electrochemical process occurring in the galvanic cell of a gas analyzer such as used for the automatic determination of gas mixture components without interrupting their function.

DRAWING

The sole figure is a schematic diagram of an electrode regenerating circuit and apparatus provided in accordance with the invention.

DETAILED DESCRIPTION

This invention relates to methods and equipment for regenerating an electrode oxidized or reduced in the galvanic cell used in an analyzer employed for the determination of gases or vapors contaminating air or other gases and present in very small concentrations.

The determination of these contaminants by the use of galvanic cells involves the dissolution of the gas to be determined in the electrolyte in the cell and the subsequent reduction or oxidation of this gas by electrons donated or withdrawn by an electrode. The intensity of the electric current which flows in the cell is a measure of the concentration of the determined component.

As the cell operates, the electrode material is oxidized or reduced and the electrode undesirably becomes inactive. It is therefore necessary either to replace the spent electrode at certain intervals of time by a fresh electrode or to regenerate it.

Thus far, regeneration of the electrode has necessitated interruption of the cell operation. This has resulted in prolonged interruptions in the determining of the component being investigated. Such breaks are often undesirable, particularly in continuous processes in which the concentration of gas components must be continuously monitored. In addition, frequency of regeneration is related to the size of the electrode itself and to the concentration of the component analyzed.

The method according to the present invention makes it possible to regenerate the electrode continuously without interrupting the cell operation, that is, with no break in the determination of the component of the gas investigated. The method involves that the oxidized or reduced material of the cell electrode be reduced or oxidized continuously by another independent electric system which does not affect the determination. The undesirable products forming in this electrochemical process are removed by a stream of the gas examined.

An apparatus according to one embodiment of the present invention comprises an electric system which contains: a D.C. source, a potentiometer, a microammeter, and an auxiliary electrode. A suitable pole of the D.C. source is connected to the electrode oxidized or reduced as the cell operates, whereas the other pole is connected through the microammeter and the potentiometer is the additional electrode which is placed in the electrolyte in the cell so that the products of the electrochemical process do not deteriorate the determination of the component in the gas. The intensity of the regeneration current is so adjusted that, on the average, it is somewhat lower than the cell current.

If the current supplied by the cell varies rapidly from a minimum to the maximum value according to the concentration of the component determined, the regeneration current should be fixed at a level much lower than the maximum current supplied by the cell and from time to time readjusted to greater intensities, and the appearance of the electrode reduced should be observed. All these operations are carried out with no break in the functioning of the cell.

A gas analyzer together with the additional electric system representing an exemplary embodiment of the present invention is shown in the accompanying drawing.

The invention and the apparatus used will be more readily uderstood by reference to an illustrative determination of chlorine contained in gases by the use of this analyzer and regeneration of its silver electrode by the present method.

A gas containing a small varying proportion of chlorine is admitted at a constant rate through a tube 1 to a coil 2 which is filled with an electrolyte, such as a sodium chloride or potassium chloride solution, supplied from cell 3 through tube 4 and through capillary 5 which controls a definite constant rate of flow of the electrolyte. In the coil 2, the gas-borne chlorine dissolves in the electrolyte and, in a separator 6, the electrolyte together with the dissolved chlorine is separated from the gas investigated and flow through tube 7 to the galvanic cell in which the chlorine is reduced at a gold electrode 11 to chlorine ions, whereas a silver electrode 12 is progressively oxidized to silver chloride.

A microammeter, i.e. a recorder 18, interconnected in the external circuit and suitably calibrated, records directly the chlorine-in-gas concentration. A potentiometer 17 is used to adjust the sensitivity of the cell within a certain range.

The oxidized silver electrode 12 of the cell 3 is regenerated without interrupting the operation of the cell. Namely, in a vessel 9 filled with the same electrolyte and connected with the cell, an additional platinum electrode is placed and connected through a switch 16 and microammeter 15 with the positive pole of the D.C. source 13. The negative pole of the source is connected with the silver electrode 12 of the cell 3 to be regenerated. After the switch 16 has been closed in, the silver electrode coated with silver chloride is reduced with a suitable current to yield silver and at the platinum electrode chlorine is evolved which is removed from the vessel 9 by means of the gas investigated, which is admitted through the tube 8.

The reduction current is adjusted by the potentiometer 14. The current is related to the degree of oxidation of the silver electrode as well as to the amount of chlorine contained in the gas investigated, that is, to the current produced by the galvanic cell.

The method and equipment according to the present invention are simple and easy to operate and they enable suitable electrodes to be regenerated in various galvanic cells, e.g. in cells for determination of oxygen, halogens, hydrogen halides, ozone, and various halogenated organic compounds. In order to be determined, the last-mentioned compounds must be converted into the corresponding halogen by well-known methods.

What is claimed is:

1. Apparatus for determining a component of a gas comprising an electrolytic cell including two electrodes, means for supplying to said cell an electrolyte means for contacting said gas to said electrolyte prior to supplying said electrolyte to said cell, whereby said component dissolves in said electrolyte and is separated from the remainder of said gas means coupled to said electrodes to measure current passing through the same thereby to analyze the gas in said electrolyte, one of said electrodes being oxidized or reduced during cell operation, a vessel separate from said cell and including an electrode therein, said vessel containing an electrolyte which is the same as that in the cell, means connecting the cell with the vessel to provide communication between the electrolyte therein, means to apply a potential to the electrode in the vessel and to said one electrode in the cell to regenerate said one electrode while the cell continuously operates, and means for conducting said remainder of said gas through said vessel to remove gas evolving from the electrolyte therein.

2. Apparatus as claimed in claim 1, wherein said one electrode in the cell is a silver electrode and the other electrode is gold, the electrode in the vessel being a platinum electrode.

3. Apparatus as claimed in claim 2, wherein said component is chlorine and the electrolyte is an alkali chloride solution.

References Cited
UNITED STATES PATENTS

| | | | |
|---|---|---|---|
| 2,898,282 | 8/1959 | Flook et al. | 204—195 |
| 2,912,367 | 11/1959 | Asendorf et al. | 204—1.1 |
| 3,080,444 | 3/1963 | Cohn et al. | 204—195 |
| 3,179,581 | 4/1965 | Lewin et al. | 204—195 |
| 3,377,256 | 4/1968 | Sambucetti et al. | 204—1.1 |

TA-HSUNG TUNG, Primary Examiner

U.S. Cl. X.R.

204—1